United States Patent [19]

Ogata et al.

[11] 4,078,423

[45] Mar. 14, 1978

[54] PRESSURE MEASURING SHEET AND METHOD FOR PRESSURE MEASUREMENT USING SAID SHEET

[75] Inventors: Yasuhiro Ogata; Noriyuki Hosoi, both of Fujimiya, Japan

[73] Assignee: Fuji Photo Film Co., Ltd., Minami-ashigara, Japan

[21] Appl. No.: 736,666

[22] Filed: Oct. 28, 1976

[30] Foreign Application Priority Data

Oct. 28, 1975 Japan .............................. 50-130080

[51] Int. Cl.$^2$ .............................................. G01L 5/00
[52] U.S. Cl. ................................................. 73/141 R
[58] Field of Search ........................ 73/88 R, 141 R; 428/307, 914, 323, 488

[56] References Cited

U.S. PATENT DOCUMENTS

| | | | |
|---|---|---|---|
| 3,469,439 | 9/1969 | Roberts et al. | 73/88 R |
| 3,936,564 | 2/1976 | Miyazawa et al. | 428/307 |
| 3,955,026 | 5/1976 | Matsukawa et al. | 428/307 |
| 3,979,141 | 7/1976 | Alsop | 428/307 |
| 3,993,831 | 11/1976 | Vassiliades | 428/914 |
| 4,002,060 | 1/1977 | Ogata et al. | 73/88 R |

*Primary Examiner*—Anthony V. Ciarlante
*Attorney, Agent, or Firm*—Sughrue, Rothwell, Mion, Zinn and Macpeak

[57] ABSTRACT

A broad range of pressures including planar and linear pressures can be measured by a pressure measuring sheet comprising a support having formed thereon a layer of microcapsules containing a color former in which the microcapsules satisfy the following relation $$\delta/D = \text{about } 4.0 \times 10^{-2} \text{ to about } 2.5 \times 10^{-1}$$

wherein D is the volume average particle size of the microcapsules, and $\delta$ is the number average capsule wall thickness of the microcapsules.

9 Claims, No Drawings

PRESSURE MEASURING SHEET AND METHOD FOR PRESSURE MEASUREMENT USING SAID SHEET

BACKGROUND OF THE INVENTION

1. Field of the Invention

This invention relates to a pressure measuring sheet and a method for measuring pressures using the sheet. More specifically, the invention relates to a pressure-measuring sheet coated with microcapsules having a volume average particle size and a number average capsule wall thickness which are in a specified ratio.

2. Description of the Prior Art

In recent years, there has been a great demand for methods for the dynamic measurement of various planar and linear pressures including, for example, clamping, pressures of bolts in general machinery, the pressurized state of automotive braking systems, various pressures encountered in thermoplastic or thermosetting fabrications such as mold pressures, clamping pressures, contact pressures between resins in molds and mold walls and molding pressures within the molds, abutting planar pressures of springs, clamping planar pressures in joint parts of carburetors, fuel pipes, fuel tanks, etc., in a fuel system, collision pressures between a human body and other objects during an automobile accident, linear and planar pressures of rubber and plastic rolls, checking the effective limits and effective conditions of gasket seals, hydraulic pressures of braking devices, the teeth abutting pressure of gears, contact planar pressures between solids, bolt clamping pressures, abutting pressures of cocks in cock valves, abutting pressures between curved surfaces, abutting pressures during the operation of rolls for rolling steel material, the distribution of pressures between human feet and the surface of a floor and the distribution of pressures between the human body and seats. Despite this, no simple method of measuring such pressures has been developed to date, and available methods are extremely complicated.

Conventional methods for measuring planar and linear pressures include, for example, methods based on strain gauges utilizing the relationship between stress and strain, and methods using load meters or pressure-sensitive paints (strain-sensitive lacquers).

When a strain gauge is used for the measurement of planar and linear pressures, large scale apparatus including an amplifier, a detector, a recorder, etc., must be used. Moreover, techniques for operating these devices and complex calculations involving material strengths are required. This type of method also has the defect that the material undergoing pressure measurement must have surface smoothness. Details of strain gauges are described, for example, in J. Yarnell "Strain Gauge," Corona-sha, etc.

The method using pressure-sensitive paints (strain-sensitive lacquers) has the disadvantages that coating unevenness tends to occur, adhesion of the coating to the material for measurement is unsatisfactory, and operation is complicated.

In the method using a load meter, it is impossible to render the device small in size, and such is unsuitable for measuring planar and linear pressures.

A pressure measuring method using a pressure-sensitive laminate is also known (see U.S. Pat. No. 3,647,504). This method relies on the use of a one-leaf type recording sheet coated with microcapsules of different wall thicknesses containing marking solutions of different colors, and, according to the pressure applied, different microcapsules are ruptured. Since the ruptured capsules contain solutions of different colors, the extent of the pressure applied can be determined from an examination of the colors. Although the extent of pressure can be qualitatively determined by this method, it is difficult to determine an exact value of the pressure applied. From the viewpoint of practical use, the pressure-sensitive laminate causes considerable coloration, and has the defect of soiling the hands and wearing apparel.

In view of this state of the art, we made a series of investigations into methods for measuring pressures of various kinds of sites without requiring large-scale apparatus, a high level of operating technique or complicated calculations. These investigations led to the discovery of an effective method which comprises bringing a recording sheet into contact with an object for pressure measurement, applying pressure thereto to develop a color, and reading the pressure from the change in the optical density or the color of the developed image on the recording sheet, the color development by pressure application being based on the pressure contact of a microcapsular layer containing a color former with a color developer layer.

This method, however, suffers from the defect that when pressure-sensitive sheets or pressure-sensitive copying sheets (as disclosed, for example, in U.S. Pat. Nos. 2,712,507, 2,730,456, 2,730,457, 3,418,250, and 3,425,327) are used as the recording sheet, the precision of pressure measurement within the pressure range of 600 kg/cm$^2$ or higher is inferior. With a view to remedying this defect, we have furthered our investigations, and found a pressure measuring sheet which exhibits superior measuring precision over pressures within a wide range.

SUMMARY OF THE INVENTION

Accordingly, it is a primary object of this invention to provide a pressure measuring sheet capable of measuring various pressures, such as planar and linear pressures, of measuring substances without requiring large scale apparatus, a high level of operating techniques or complicated calculations.

A second object is to provide a method for measuring pressures such as planar and linear pressures by a simple dynamic measuring procedure utilizing a pressure measuring sheet.

A third object is to provide a pressure measuring sheet capable of obtaining measured values of high precision in measuring pressures such as planar or linear pressures within a range of about 600 kg/cm$^2$ to about 2,000 kg/cm$^2$.

A fourth object is to provide a pressure measuring sheet capable of simply measuring not only the pressure of a point, but also pressures distribution such as a planar or linear pressure.

A fifth object of this invention is to provide a pressure measuring sheet in which a pattern of the measured pressure distribution can be kept for a long period of time.

A sixth object is to provide a pressure measuring sheet which does not soil the hands and wearing apparel and causes little coloration.

The above objects of this invention are achieved by a method which comprises coating a sheet with microcapsules which satisfy the following relation:

$\delta/D =$ about $4.0 \times 10^{-2}$ to about $2.5 \times 10^{-1}$ wherein D is the volume average particle size of the microcapsules and δ is the number average capsule wall thickness of the microcapsules, bringing the resulting pressure measuring sheet into contact with a measuring site of an object, applying pressure to the assembly to develop a color, and reading the pressure from changes in the optical density or color of the developed colored image on the sheet, the color development of the pressure-measuring sheet being based on the pressure contact of a microcapsuler layer containing a color former with a color developer layer.

DETAILED DESCRIPTION OF THE INVENTION

The ratio of the number average capsule wall thickness (δ) to the volume average particle size (D) of the microcapsules used in the present invention is preferably in the range of from about $4.0 \times 10^{-2}$ to about $2.5 \times 10^{-1}$, more preferably from $4.0 \times 10^{-2}$ to $1 \times 10^{-1}$, especially preferably from $4.5 \times 10^{-2}$ to $8.0 \times 10^{-2}$.

When the δD ratio of the microcapsules is higher than the specified range, the increase in density as a result of color formation at high pressures is too small, and precision of measurement is reduced. When this ratio is lower than the specified range, the increase in density according to changes in pressure is difficult to detect.

The pressure-measuring sheet used in the method of this invention is produced by providing a microcapsule layer containing a color former and a color developer layer either on one surface of a support together or separately on opposite surfaces of a support or separately on the surfaces of different supports.

Microcapsules utilizable for the recording sheet of this invention can be prepared by conventional processes, such as coacervation (as disclosed, for example, in U.S. Pat. Nos. 2,800,457, 2,800,458, 3,041,289, and 3,687,865), interfacial polymerization (as disclosed, for example, in U.S. Pat. Nos. 3,492,380, and 3,577,515, and British Pat. Nos. 950,433, 1,046,469 and 1,091,141), internal polymerization (as disclosed, for example, in British Pat. No. 1,237,498, and French Pat. Nos. 2,060,818 and 2,090,862), and exterior polymerization (as disclosed, for example, in British Pat. No. 989,264, and Japanese Patent Publications Nos. 12380/62, 14327/62, 29483/70, 7313/71, and 30282/71).

Any known conventional solvents can be used in this invention to dissolve the color former. Examples of the solvents include aromatic synthetic oils such as alkylated naphthalenes, alkylated biphenyls, hydrogenated terphenyl or alkylated diphenylmethanes (each of which contains 1 to 4 alkyl groups each with about 1 to 5 carbon atoms), petroleum fractions such as kerosene, naphtha or paraffin oils, aliphatic synthetic oils such as chlorinated paraffins, vegetable oils such as cotton seed oil, soybean oil or linseed oil, and mixtures of these. The concentration of the color former solution is not particularly restricted, but a suitable weight ratio of the color former to the solvent is preferably about 0.001: 1 to about 0.3: 1 and more preferably about 0.01: 1 to about 0.1: 1.

The color former used in this invention is an electron-donating colorless organic compound which yields a color upon contact with a solid acid.

The type, properties, etc., of the color former do not substantially affect the present invention, and therefore, all color formers can be used, for example, triarylmethane-type compounds, diarylmethane-type compounds, xanthene-type compounds, thiazine-type compounds, and spiropyran-type compounds, etc.

Specific examples of the triarylmethane-type compounds are 3,3-bis(p-dimethylaminophenyl)-6-dimethylaminophthalide (i.e., Crystal Violet Lactone), 3,3-bis(p-dimethylaminophenyl)-phthalide, 3-(p-dimethylaminophenyl)-3-(1,2-dimethylindol-3-yl)-phthalide, 3-(p-dimethylaminophenyl)-3-(2-methylindol-3-yl)-phthalide, 3-(p-dimethylaminophenyl)-3-(2-phenylindol-3-yl)-phthalide, 3,3-bis-(1,2-dimethylindol-3-yl)-5-dimethylaminophthalide, 3,3-bis-(1,2-dimethylindol-3-yl)-6-dimethylaminophthalide, 3,3-bis-(9-ethylcarbazol-3-yl)-5-dimethylaminophthalide, 3,3-bis-(2-phenylindol-3-yl)-dimethylaminophthalide, and 3-p-dimethylaminophenyl-3-(1-methylpyrrol-2-yl)-6-dimethylaminophthalide, etc.

Examples of the diarylmethane-type compounds are 4,4'-bis-dimethylaminobenzohydrin benzyl ether, N-halophenyl leuco auramines, and N-2,4,5-trichlorophenyl leuco auromine, etc.

Examples of the xanthene-type compounds include rhodamine-B-anilinolactam, rhodamine-(p-nitroanilino)lactam, rhodamine-B-(p-chloroanilino)lactam, 7-dimethylamino-2-methoxyfluorane, 7-diethylamino-2-methoxyfluorane, 7-diethylamino-3-chloro-2-methylfluorane, 7-diethylamino-3-(acetylmethylamino)-fluorane, 7-diethylamino-3-(benzylamino) fluorane, 7-diethylamino-3-(methylbenzylamino) fluorane, 7-diethylamino-3-(chloroethylamino) fluorane, and 7-diethylamino-3-(diethylamino) fluorane, etc.

Examples of the thiazine-type compounds are benzoyl leuco methylene blue and p-nitrobenzoyl leuco methylene blue, etc.

Examples of the spiropyran compounds include 3-methyl-spiro-dinaphthopyran, 3-ethyl-spiro-dinaphthopyran, 3,3'-dichloro-spiro-dinaphthopyran, 3-benzyl-spiro-dinaphthopyran, 3-methyl-naphtho-(3-methoxybenzo)-spiropyran, and 3-propyl-spiro-dibenzodipyran, etc.

These color former compounds can be used alone or as admixtures of two or more thereof.

By dissolving the color former in the solvent, and encapsulating the resulting solution, a microcapsule coating solution usable in this invention can be obtained. Desirably, the microcapsules are mononuclear, but the objects of this invention can also be achieved even if they are polynuclear. The size of the microcapsules is usually about 0.1 to about 100 microns, preferably about 0.5 to about 50 microns. Microcapsules of these sizes are preferred in the present invention.

Since the microcapsule coating composition is usually a dispersion of microcapsules, it can be directly coated on a support. Or, with or without separating the microcapsules from the capsule dispersion, a binder, e.g., a natural or synthetic polymer having a hydrophilic property, such as a latex (e.g., a styrene/butadiene rubber latex, etc.) or a water-soluble polymeric substance (e.g., starch, carboxymethyl cellulose, polyvinyl alcohol, gum arabic, casein, or gelatin) may be added prior to coating. It is also possible to add a capsule-reinforcing agent, such as a finely powdered cellulose (see U.S. Pat. No. 2,711,375), a finely powdered polymer (see U.S. Pat. No. 3,625,736), finely powdered starch (see British Pat. No. 1,232,347), or microcapsules not containing a color former (see British Pat. No. 1,235,991) to the capsule coating composition or the capsule layer. Preferably, the capsule-reinforcing agent is not present in the layer, but is present in the capsular layer or on its surface.

The amount of the capsule composition coated (solids basis) is about 0.5 to about 30 g/m², particularly conveniently about 2 to 20 g/m².

The support used in this invention includes, for example, plastic films (e.g., polyethylene and polyethylene terephthalate), metal foils, paper, resin-coated papers, and synthetic paper-like sheets. The thickness of the support is usually about 10 to about 1000 microns, preferably about 15 to about 500 μ.

The microcapsule layer is coated on at least one surface of a support, or on or beneath a color developer layer to be described in the following, or on a surface opposite to that surface of a support on which the color developer layer is formed (e.g., a multiply assembly). A suitable weight ratio of the microcapsules to the color developer is preferably about 0.01:1 to about 100:1, more preferably 0.03:1 to 3:1.

In the present specification and claim(s) a color developer means a solid acid, more specifically, an electron-receptive solid acid. The color developer is described in the prior patents cited hereinabove. Specific examples include clays such as acid terra alba, active terra alba, or attapulgite; organic acids, for example, aromatic carboxyl compounds such as salicylic acid, aromatic hydroxy compounds such as p-t-butyl phenol, p-t-amyl phenol, o-chlorophenol, m-chlorophenol or p-chlorophenol, or metal salts of these such as zinc salts of these; mixtures of organic acids with metal compounds such as zinc oxide; and acidic polymers such as a phenol/formaldehyde resin or a phenol/acetylene resin. Useful color developers are also described in U.S. Pat. Nos. 3,501,331, 3,669,711, 3,427,180, 3,455,721, 3,516,845, 3,634,121, 3,672,935, and 3,732,120, and Japanese Patent Publications Nos. 48545/70, 49339/70, 93245/70, 92246/70, 93247/70, 94874/70, 109872/70, 112038/70, 112039/70, 112040/70, 112753/70, 112754/70, 118978/70, 118979/70, and 86950/71.

The color developer may be coated on a support, together with a binder, e.g., with the weight ratio of the binder to the color developer ranging from about 0:1 to about 10:1, preferably 0.05:1 to 2:1. The support may be the same as that described hereinabove. Examples of the binder include a styrene/butadiene rubber latex, and a styrene/butadiene/acrylonitrile latex; water-soluble natural polymeric compounds such as proteins (e.g., gelatin, gum arabic, albumin, or casein), celluloses (e.g., carboxymethyl cellulose or hydroxyethyl cellulose), and saccharoses (e.g., agar, sodium alginate, starch, or carboxymethyl starch); water-soluble synthetic polymeric compounds such as polyvinyl alcohol, polyvinyl pyrrolidone, polyacrylic acid or polyacrylamide; and organic solvent-soluble polymeric compounds such as nitrocellulose, ethyl cellulose, polyesters, polyvinyl acetate, polyvinylidene chloride, or a vinyl chloride/vinylidene chloride copolymer. These binder compounds can also be used as a binder for the microcapsule dispersion. Known conventional additives can be incorporated in the color developer layer, if desired.

In the present invention, the pressure measuring sheet is required firstly to be such that within the range of measurable pressures there should be a correlation between the pressure exerted and changes in the optical density or color of a color image formed by pressure contact (for example, proportional or inversely proportional). Secondly, it is required that within the domain of the above relation, measurement error be small, and precision of measurement be high.

We have continued a series of investigations particularly on the second requirement, and found that when microcapsules having a δ/D ratio (in which D is the volume average particle size in microns of the microcapsules, and δ is the number average capsule wall thickness in microns of the microcapsules) of from about $4.0 \times 10^{-2}$ to about $2.5 \times 10^{-1}$ are used, a pressure-measuring sheet can be obtained which exhibits reduced measurement error and a high precision in measurement of pressures such as planar and linear pressures within the range of from about 600 kg/cm² to about 2,000 kg/cm². Factors which affect the capsule wall thickness include the weight ratio of the capsule wall material to the color former oil, the capsule size, the density of the capsule wall which is formed, the density of the oil or solvent used for the color former and the weight ratio of the capsule wall formed to the capsule wall material used. These factors can be varied to form a desired δ/D ratio for the microcapsules.

In performing the process of this invention, the pressure-measuring sheet is placed at the site where pressure is to be measured, and pressure is applied thereto. The sheet develops a color according to the degree of pressure. Then, the pressure exerted is read from changes in the optical density or color of the colored image. The pressure applied may be determined by using a conventional instrument such as a densitometer, or by means of a separately prepared evaluation table or calibration curve showing the relationship between the pressure applied and the density of color.

The pressure-measuring method of this invention is extremely simple, and does not require large-scale sophisticated apparatus involving an amplifier, a detector, a recorder, etc., as compared with conventional methods of measuring planar and linear pressures using strain gauges, load meters, or pressure-sensitive paints, etc. Moreover, since the method of this invention does not require a high level of operating techniques nor complicated calculations involving material strengths, and is scarcely affected by the surface smoothness of the material to be measured, it can be applied to a broad range of materials.

Furthermore, while most other pressure measuring methods are directed to the measurement of pressure at a point, the measuring method using the pressure measuring sheet of this invention permits the measurement of a broad pressure distribution of planar and linear pressures, etc. In addition, the pattern of the pressure distribution can be recorded on the pressure-measuring sheet, and can be stored for a long period of time.

The pressure measuring sheet of this invention is also free from the defect, possessed, for example, by pressure-sensitive laminates, of causing the soiling of the hands or wearing apparel, and heavy coloration.

Still another advantage of the invention is that when pressures such as planar and linear pressures within the range of about 600 kg/cm² to about 2,000 kg/cm² are measured using the pressure measuring sheet of this invention, measured values of high accuracy with little error can be obtained.

In the present application, the volume average particle size D of microcapsules, and the number average capsule wall thickness δ of microcapsules are measured by the following methods.

A. Method of measuring the volume average particle size D of microcapsules

A microcapsular composition is added in a concentration of 10 to 100 ppm to 100 ml. of a 1 wt.% aqueous solution of sodium chloride, and the mixed solution is stirred. Measurement is made in a conventional manner by means of a universal particle size distribution measuring device (Coulter Counter Model TA, a product of Coulter Electronics, Inc., Hialeah, Fla., U.S.A.), and the volume average particle diameter D (microns) is calculated.

B. Measurement of the number average capsule wall thickness δ of microcapsules A microcapsule coating composition is coated on a surface-treated polyethylene terephthalate film base, and adhered tightly with an epoxy resin. The assembly is allowed to stand for one day at 60° C to solidify it. An ultrathin piece is prepared by cutting with an ultramicrotome (MT-I type, Ivan-Sorvall Co.) so that microcapsules are cut exactly in half. The ultrathin piece is photographed using a film (Fuji FG Film for Electron Microscopes, made by Fuji Photo Film Co., Ltd.) by means of a transmission-type electron microscope (HU-12A) type, a product of Hitachi Limited) with a magnification of about 10,000 to 50,000X at an acceleration voltage of 100 KV. The capsule wall thickness is measured from the photograph, and the values (about 100) obtained are averaged to get the number average capsule wall thickness δ (microns).

The following Example and Comparative Examples illustrate the useful practical advantages of the pressure measuring sheet and pressure measuring method in accordance with this invention. Needless to say, the invention is not to be construed as being limited to the Example.

EXAMPLE

Rhodamine B lactam (3 parts) and 3 parts of 3-diethylamino-7-methylfluorane were dissolved in 35 parts of alkylated diphenylmethane compound (such as, 1-(dimethylphenyl)-1-phenyl ethane), and 10 parts of a trimethylol propane adduct of tolylene diisocyanate (an adduct of 1 mol of trimethylol propane with 3 mols of tolylene diisocyanate), 10 parts of a trimethylol propane adduct of hexamethylene diisocyanate (an adduct of 1 mol of trimethylol propane with 3 mols of hexamethylene diisocyanate) and 0.2 part of a propylene oxide adduct of ethylenediamine were dissolved in the solution. The resulting solution was emulsified and dispersed in a solution prepared by dissolving 2 parts of caboxymethyl cellulose and 2 parts of polyvinyl alcohol in 40 parts of water. During emulsification, the temperature was set at 20° C. After the emulsification, 150 parts of water was added, and, with stirring, the solution was heated to 70° C. Furthermore, the temperature of the solution was cooled and maintained at 30° C, and 5 parts of cellulose floc (major axis about 50 to 100 microns; minor axis about 20 to 30 microns) and 10 parts of oxidized starch were added to form a microcapsule coating composition. In the resulting microcapsule coating composition, the ratio of the number average capsule wall thickness δ to the volume average particle size D (δ/D) was $8.7 \times 10^{-2}$.

The resulting microcapsular solution was coated on a sheet of paper at a rate of 5 g/m² by means of an air knife coater, and dried to form a color former sheet.

50 parts of p-phenylphenol/formaldehyde resin, (1:1 molar ratio), 100 parts of butyl acetate and 100 parts of toluene were kneaded in a ball mill for 24 hours to form a color developer coating solution. The coating solution was coated on the color former sheet at a rate of 6 g/m², and dried to form a pressure measuring sheet capable of measuring pressures (mono sheet).

In order to measure the nip pressure between the calendar rolls of a paper machine, the resulting pressure measuring sheet was set between the rolls, and nip pressure applied.

Separately, varying pressures ranging from 600 kg/cm² to 2,000 kg/cm² at 200 kg/cm² intervals were applied to the same pressure measuring sheet as was used above to develop colors. The colored marks were measured by a densitometer, and a calibration curve showing the relationship between applied pressures and densities measured.

The pressure measuring sheet set between the rolls was taken out, and the color image measured by a densitometer. The pressure applied was read by comparing it with the calibration curve. It was found that the density of the colored image was 0.34, and the pressure was about 850 kg/cm².

Comparative Example 1

For comparison, a strain gauge (made by Baldwin Locomotive Works) was set between the calender rolls in the same manner as in the Example, and the nip pressure measured. Since this method uses a strain gauge requiring large-scaled, sophisticated apparatus involving an amplifier, a detector, and a recorder, and moreover, measures pressures at a point, it was impossible to determine the distribution of the nip pressure between the calender rolls, which could be measured by the pressure measuring sheet of the invention, over a broad range (for example, in the widthwise direction).

Comparative Example 2

A microcapsule coating composition in which the ratio of the number average capsule wall thickness of the microcapsules to the volume average particle size of the microcapsules (δ/D) was $3.5 \times 10^{-2}$ was prepared in the same way as in the Example. Furthermore, in the same way as in the Example, a color developer coating composition was prepared. These compositions were coated in the same way as in the Example to form a pressure measuring sheet. A calibration curve was prepared in the same way as in the Example, and the pressure measuring sheet was set between the calender rolls to measure the nip pressure.

According to the method in this example, error was high, and accuracy was extremely poor. Thus, accurate pressure measurement was impossible.

The relationship between the pressures and densities in the pressure-measuring sheet in accordance with the Example of this invention is shown below in comparison with that of Comparative Example 2.

| Pressures applied (kg/cm²) | Pressure-measuring sheet | Sheet of the Example (color density) | Sheet of Comparative Example 2 (color density) |
| --- | --- | --- | --- |
| 600 | | 0.20 | 0.90 |
| 800 | | 0.31 | 0.95 |
| 1000 | | 0.43 | 0.92 |
| 1200 | | 0.52 | 0.96 |
| 1400 | | 0.64 | 0.90 |
| 1600 | | 0.75 | 0.91 |
| 1800 | | 0.86 | 0.90 |

-continued

| Pressures applied (kg/cm²) | Pressure-measuring sheet | Sheet of the Example (color density) | Sheet of Comparative Example 2 (color density) |
| --- | --- | --- | --- |
| 2000 | | 0.98 | 0.88 |

The above results demonstrate that the pressure-measuring sheet of the invention provides a low measuring error and extremely high accuracy in measuring pressures ranging from 600 kg/cm² to 2,000 kg/cm².

While the invention has been described in detail and with reference to specific embodiments thereof, it will be apparent to one skilled in the art that various changes and modifications can be made therein without departing from the spirit and scope thereof.

What is claimed is:

1. A pressure-measuring sheet comprising a support having thereon a layer of microcapsules containing a color former capable of forming a color on contact with a color developer, the microcapsules in said layer satisfying the following relationship $$\delta/D = \text{about } 4.0 \times 10^{-2} \text{ to about } 2.5 \times 10^{-1}$$

wherein $D$ is the volume average particle diameter of the microcapsules, and $\delta$ is the number average capsule wall thickness of the microcapsules.

2. The pressure-measuring sheet of claim 1, wherein the $\delta/D$ ratio is from $4.0 \times 10^{-2}$ to $1.0 \times 10^{-1}$.

3. The pressure-measuring sheet of claim 1, wherein the $\delta/D$ ratio is from $4.5 \times 10^{-2}$ to $8.0 \times 10^{-2}$.

4. The pressure-measuring sheet of claim 1, further including on the support a layer of a color developer.

5. The pressure-measuring sheet of claim 1, wherein the thickness of the support ranges from about 15 to 500 microns.

6. A method for measuring pressure which comprises bringing a pressure measuring sheet having thereon a layer of microcapsules containing a color former capable of forming a color on contact with a color developer, the microcapsules in the layer satisfying the following relationship $$\delta/D = \text{about } 4.0 \times 10^{-2} \text{ to } 2.5 \times 10^{-1}$$

wherein $D$ is the volume average particle diameter of the microcapsules, and $\delta$ is the number average capsule wall thickness of the microcapsules, into contact with the site at which pressure is to be measured in the presence of a layer of a color developer, allowing the pressure to be applied to said sheet whereby said microcapsules are ruptured and a color is developed by contact with said color developer, and reading the pressure from changes in the optical density of or color of the developed colored image.

7. The method of claim 6, wherein the $\delta/D$ ratio is from $4.0 \times 10^{-2}$ to $1.0 \times 10^{-1}$.

8. The method of claim 6, wherein the $\delta/D$ ratio is from $4.5 \times 10^{-2}$ to $8.0 \times 10^{-2}$.

9. The method of claim 6, wherein said layer of a color developer is a color developer coated sheet.

* * * * *